May 7, 1968   R. L. GLIDDEN   3,381,904
PROCESSING APPARATUS
Filed Oct. 26, 1964   3 Sheets-Sheet 1
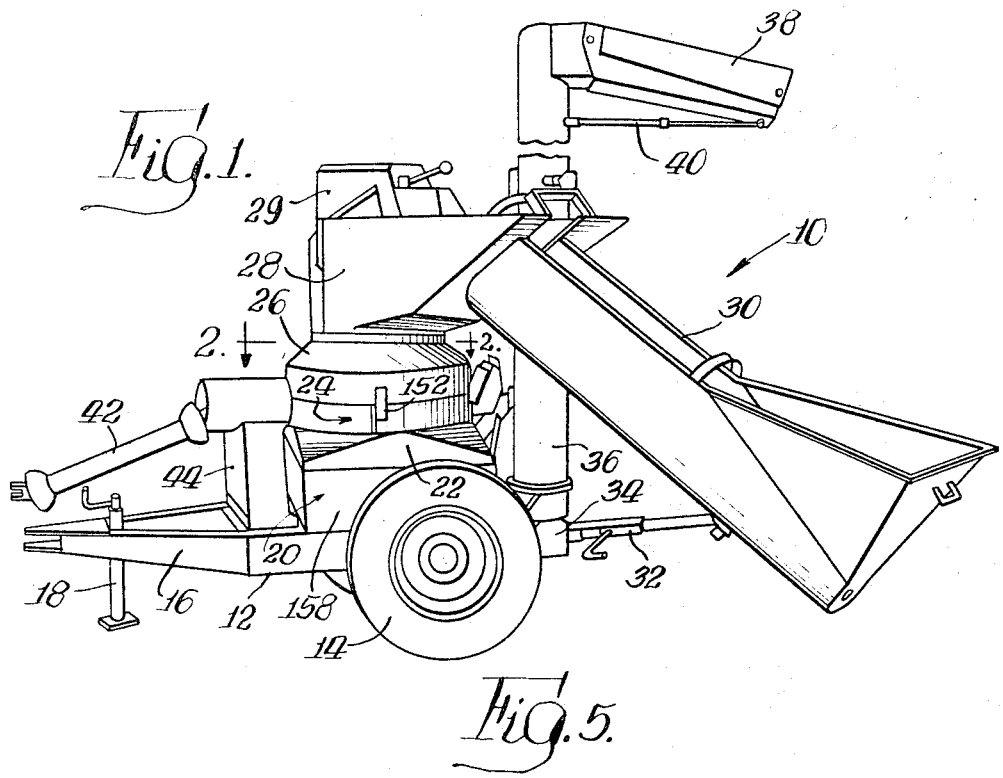
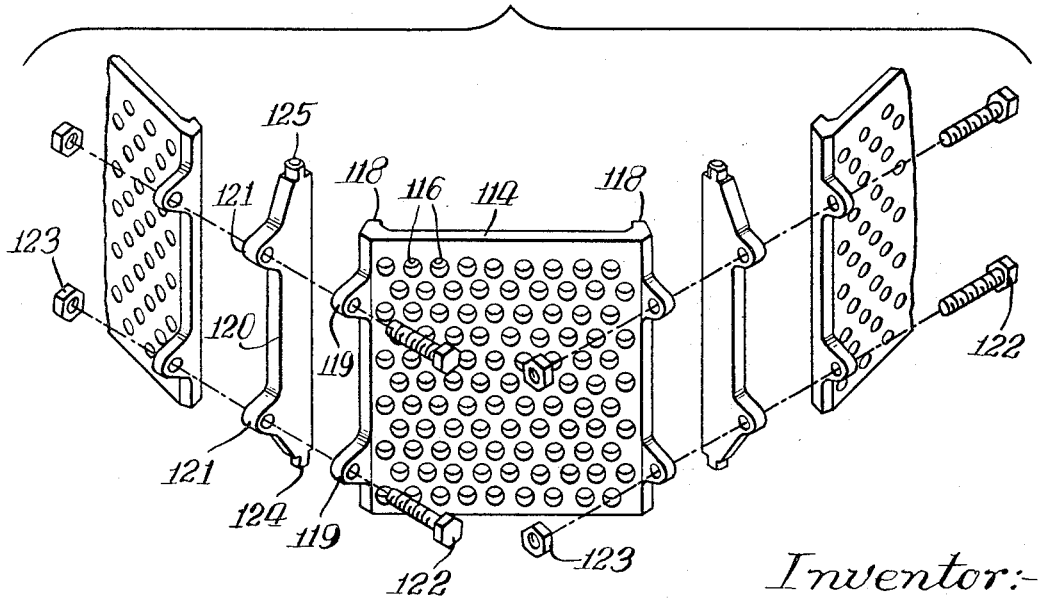
Inventor:-
Robert L. Glidden,
By Brown, Jackson, Boettcher & Dienner
Attys.

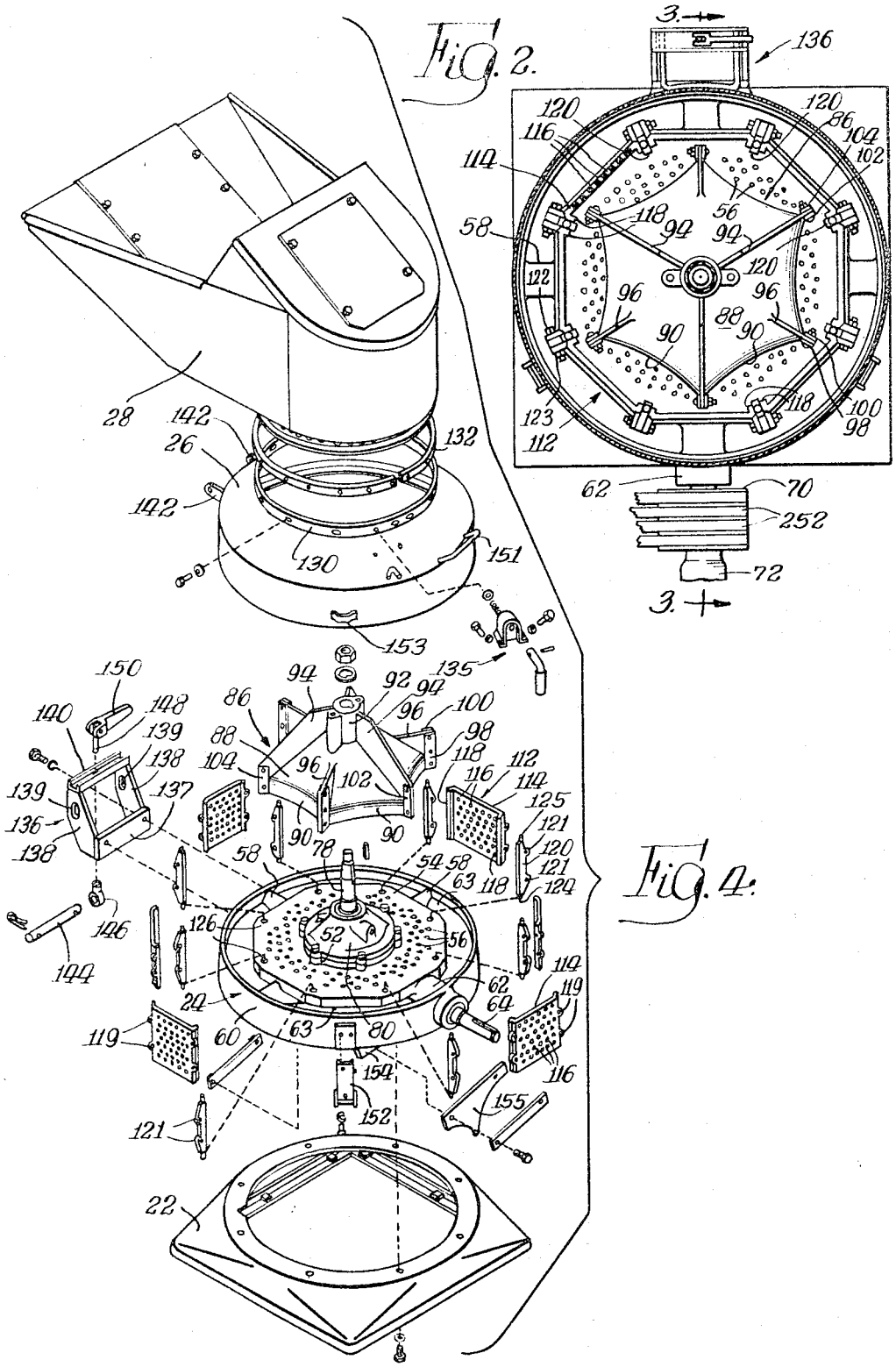

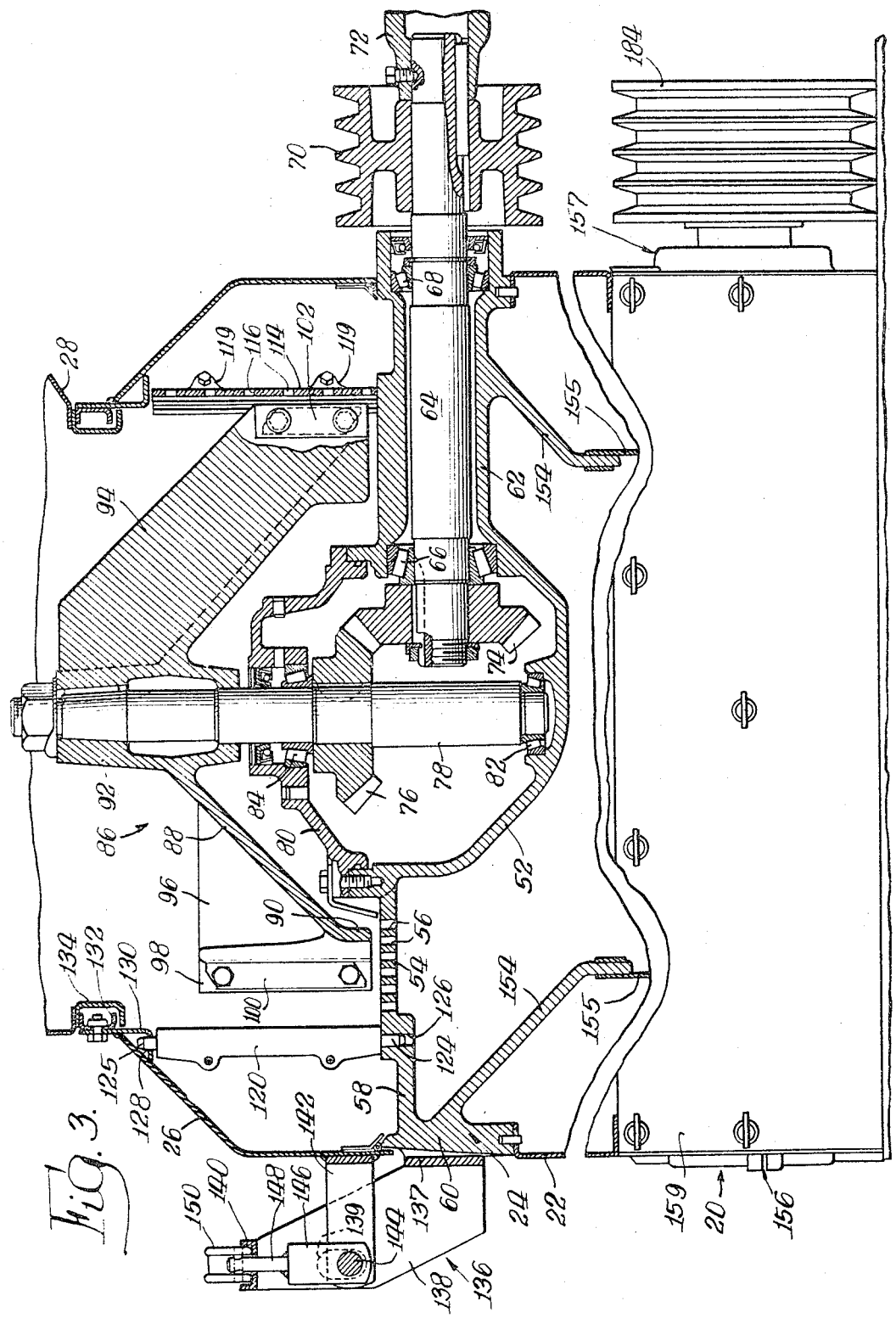

United States Patent Office 3,381,904
Patented May 7, 1968

3,381,904
PROCESSING APPARATUS
Robert L. Glidden, Kewanee, Ill., assignor to Kewanee Machinery & Conveyor Company, Kewanee, Ill., a corporation of Illinois
Filed Oct. 26, 1964, Ser. No. 406,431
12 Claims. (Cl. 241—73)

My present invention relates generally to apparatus for processing grain material, such as ears of corn, into feed, and more particularly to a corn chopper assembly comprised of an impeller rotatable about a vertical axis, perforated enclosure or screen means extending about the circumference of the impeller, and associated shearing means, whereby ears of corn may be broken up into fragments and discharged through the perforated enclosure means.

It is an object of my present invention to provide an improved form of rotatable impeller wherein vertical cutter bars, which are mounted at the outer ends of the vanes of the impeller, are detachable so that they may be inverted and reversed relative to the vanes whereby to permit the cutting edges of each of the cutter bars to be alternately presented for cutting or sheathing action.

It is another object of my present invention to provide an improved form of perforated enclosure means or sizing screen assembly which is comprised of a plurality of independent generally rectangular perforated wall sections, cutter or shearing bars interposed alternately with the wall sections, and means for interconnecting the cutter bars between adjacent wall sections. By fabricating the screen walls and cutter bars as independent parts, manufacturing costs are minimized and replaceability is facilitated.

Now in order to acquaint those skilled in the art with the manner of constructing and using apparatus in accordance with the principles of my present invention, I shall describe in connection with the accompanying drawings a preferred embodiment of my invention.

In the drawings:

FIGURE 1 is a perspective view of a mobile corn chopper and roller mill unit incorporating the principles of my present invention;

FIGURE 2 is a horizontal sectional view, on an enlarged scale, of the corn chopper assembly of my present invention, taken substantially along the line 2—2 in FIGURE 1, looking in the direction indicated by the arrows;

FIGURE 3 is a vertical view on a further enlarged scale, partly in section and partly in elevation, of the corn chopper assembly of my present invention, taken substantially along the line 3—3 in FIGURE 2, looking in the direction indicated by the arrows;

FIGURE 4 is an exploded perspective view of the corn chopper assembly and related parts shown in FIGURES 2 and 3; and FIGURE 5 is an exploded perspective view of a portion of the sizing screen assembly shown in FIGURES 2, 3 and 4.

Referring now to FIGURE 1, there is indicated generally by the reference numeral 10 a mobile corn chopper and roller mill unit incorporating the principles of my present invention. The mobile unit 10 comprises a chassis or main frame 12 which is supported on an axle and wheel assembly 14. The frame 12 is provided at one end with a triangular extension 16 that serves as a hitch for pivotal attachment to the rear end of a tractor or the like, or to channel rails for stationary installation. Secured to the triangular extension 16 is a generally vertically extending jack 18 which has a lower end engageable with the ground and which is manually operable for levelling the mill 10. Supported on the main frame 12 in superposed relation are a roller mill housing 20, a roller mill shroud 22, a corn chopper gear housing assembly 24, a generally annular corn chopper shroud 26, a hopper 28 and a feeder auger transmission housing 29. Extending generally angularly downwardly from the hopper 28 is a feeder auger housing 30 having a feeder auger (not shown) mounted therein. The height of the lower end of the feeder auger housing 30 is adapted to be adjusted by means of an extensible jack assembly 32 which, at its one end, is pivotally connected to the housing 30 and, at its other end, is adapted to bear against the main frame 12. Extending longitudinally of the main frame 12 immediately beneath the roller mill housing 20 is a horizontal auger housing 34 which serves to support at one end a generally vertical auger housing 36 provided at its upper end with a lateral gravity discharge spout 38. Suitable augers (not shown) are mounted within the auger housings 34 and 36 for conveying milled grain from the bottom of the roller mill housing 20 to an elevated point of discharge. The generally vertical auger housing 36 is arranged to be selectively tilted 25 degrees to either side. Gravity discharge spout 38 can be rotated through 360 degrees and the downward angular position thereof is adapted to be adjusted by means of an extensible tie rod 40. The corn chopper and roller mill assemblies of the unit 10 are adapted to be driven from the power takeoff shaft of a tractor through suitable power transmission means including a main drive shaft 42 and sheave and belt means enclosed within a cover 44.

Referring now to FIGURES 2, 3 and 4, I shall describe the details of construction of the corn chopper assembly of the unit 10, which includes the gear housing assembly 24, and which is arranged, in part, within the shroud 26. The gear housing assembly 24 is comprised of a central casing portion 52, a horizontal supporting plate or disc portion 54 thereabout having a plurality of apertures or openings 56 extending therethrough, a plurality of circumferentially spaced radial web segments 58, an outer annular rim portion 60, and a tubular sleeve portion 62 extending radially from the casing portion 52 and through the rim portion 60. This construction serves to define a plurality of generally arcuate grain passageway areas 63. A horizontal impeller drive shaft 64 is rotatably mounted by means of roller bearing assemblies 66 and 68 within the tubular sleeve portion 62. The end of the drive shaft 64 that projects outwardly of the tubular sleeve 62 has mounted thereon both a sheave 70 and the one end 72 of a universal joint (not shown) having suitable driving connection with the main drive shaft 42 shown in FIGURE 1. The end of the impeller drive shaft 64 that projects into the casing 52 has secured thereon a bevel gear 74 which has meshing engagement with a bevel gear 76 secured on a vertical impeller drive shaft 78. The casing 52 is enclosed by a cover member 80 and the drive shaft 78 is rotatably mounted by means of roller bearing assemblies 82 and 84 in the casing 52 and the casing cover 80. The feeder auger within the housing 30 is adapted to be drivingly connected with the impeller drive shaft 78 through transmission gearing within the housing 29 (FIGURE 1).

Mounted for rotation with the vertical drive shaft 78 is an impeller indicated generally by the reference numeral 86. The impeller 86 includes a hollow pyramidal body portion 88 with lower scalloped or concave apron portions 90, and an upper hub portion 92 suitably secured to the upper end of the drive shaft 78. The impeller 86 further includes vertical radially extending circumferentially spaced sets of vane members 94 and 96. The set of vane members 94, which preferably number three, extend from the hub portion 92 downwardly along the impeller body 88 and terminate at the outer periphery thereof, while the set of vane members 96, which are alternately arranged with respect to the vane members 94, project outwardly of the impeller body 88 and terminate at the periphery thereof. The vertical extent of the terminal edges of the vane members 96 is greater than the vertical extent of the terminal edges of the vane members 94.

In accordance with the principles of my present invention, there are removably secured to each of the terminal edges of the vane members 96, as by screws, a vertical cutter bar 98 and a cooperating vertical lock plate 100. Also, removably secured to each of the terminal edges of the vane members 94, as by means of screws, are a vertical cutter bar 102 and a cooperating vertical lock plate 104. The cutter bars 98 and lock plates 100 have a greater vertical extent than the cutter bars 102 and lock plates 104. Because the cutter bars 98 and 102 are detachable, they may be reversed and inverted to permit all four cutting edges thereof to be alternately presented for cutting or shearing action prior to sharpening or replacement.

Surrounding the impeller 86 is an octagonal sizing screen assembly 112 which is comprised of independent vertical wall sections 114 with a plurality of openings or perforations 116 formed therethrough. As shown in FIGURES 2, 4 and 5, the sides of the wall sections 114 are formed with radially inwardly directed flange portions 118 and radially outwardly directed lug portions 119. Interposed alternately with the wall sections 114 are vertical cutter bars 120. Each of the cutter bars 120 has sides seating against the flange portions 118 of adjacent wall sections 114 and forward vertical cutting edges disposed radially inwardly beyond the ends of the flange portions 118. Each of the cutter bars 120 also has rearwardly extending lugs 121 that are secured by bolts 122 and nuts 123 between the lugs 119 of adjacent wall sections 114. Still further, the opposite ends of the cutter bars 120 are provided with vertical pin members 124 and 125. In accordance with the principles of my present invention, the screen walls 114 and cutter bars 120 are fabricated as independent parts to minimize manufacturing costs and to facilitate replaceability.

When the wall sections 114 and cutter bars 120 are secured in assembled relation, the resultant screen assembly 112 is adapted to be located and maintained in position between the supporting plate 54 and the shroud 26. In one vertical position of the screen assembly 112 shown in FIGURE 3, the pin members 124 are adapted to be received in openings or apertures 126 formed in the plate portion 54 of the gear housing assembly 24, and the pin members 125 are adapted to be received in openings or apertures 128 formed in the horizontal flange portion of an annular collar member 130 secured to the shroud 26 at the upper end thereof. The screen assembly 112 may be inverted from the position shown in which case the pin members 125 are received in the plate openings 126 while the pin members 124 are received in the shroud openings 128. By permitting inversion of the screen assembly 112, both cutting edges of each of the cutter bars 120 and both sides of each of the screen perforations 16 may be utilized in the processing operation. Because of the described mounting of the screen assembly 112, the screen assembly may be initially positioned, repositioned, removed or inverted, without the use of hand tools.

The screen assembly 112 also serves as a structural support for apparatus mounted on top of the corn head shroud 26. The screen assembly 112 is of regular polygonal configuration so that it may be rotated angularly from one operative position to another with any particular set of screen pins 124 and 125 being moved to successive sets of mounting openings 126 and 128, whereby to permit equalization of wear at various locations about the assembly. Since the screen assembly 112 extends about the full circumference of the impeller 86, and since both the screen assembly 112 and impeller 86 are vertically disposed, ears of corn may be broken up into fragments and discharged through the screen perforations 116 throughout the 360 degree extent of the corn chopper assembly, with the processing action being substantially equalized thereabout. The cutter bars 98 and 102 wedge grain fragments against the inner flat surfaces of the octagonal screen as the cutter bars pass thereby thus increasing the discharge capacity of this screen over conventional round screens. As will be observed from FIGURES 2 and 4, the number of screen cutters 120 is different than the number of impeller cutters 98 and 102 so that not all pairs of cutters are simultaneously cutting or shearing material, thereby minimizing the power requirements of the corn chopper assembly.

The hopper 28, which is vertically above the corn chopper assembly, is mounted on the shroud 26 for rotation through 360 degrees relative thereto. In this connection, an annular C-shaped inwardly facing channel ring 132 (FIGURE 3) is secured, as by bolts, to the inboard side of the collar member 130 adjacent the upper end thereof. The channel ring 132 serves to support an annular C-shaped outwardly facing channel ring 134 the upper flange portion of which is secured to the lower wall portion of the hopper 28. The channel ring 134 is rotatably slidable relative to the channel ring 132 whereby to accommodate rotation of the hopper 28 relative to the shroud 26. The hopper 28 may be locked in any rotative position by means of latch mechanism indicated generally at 135 in FIGURE 4. To permit access to be had to the impeller 86 and the screen assembly 112, the shroud 26 and hopper 28 are adapted to be tilted or swung upwardly and away from their normal position shown in FIGURES 1 and 3. For this purpose, a floating pivotal mounting is provided between the shroud 26 and the gear housing assembly 24 (FIGURES 3 and 4). This mounting comprises a bracket assembly 136 including a transverse bar 137 secured to the side of the gear housing assembly 24, a pair of laterally spaced side wall members 138 having vertically elongated slots 139 formed therethrough, and a transverse upwardly facing C-shaped channel member 140. Secured to the side of the corn chopper shroud 26 are a pair of parallel strap members 142 the outer ends of which are received within the bracket assembly 136. Extending through the strap members 142 is a transverse hinge rod 144 the ends of which are received in the vertical slots 139. The hinge rod 144, intermediate of its ends, is secured within a collar member 146 having an extension pin portion 148 that projects through the bight portion of the bracket channel 140. The upper end of the pin 148 is pivotally mounted in the bifurcated cam end of a pivot handle 150. The high point of the cam end of the handle 150 is arranged so that, as the handle 150 is pivoted upwardly from a horizontal to a vertical position, the pin 148 is drawn vertically upwardly. Such movement of the pin 148 serves to slightly raise the shroud 26 at the floating pivotal mounting thereof whereupon the adjacent openings 128 in the shroud collar 130 are withdrawn from the pin members 125 thereby permitting the shroud 26 to be pivoted about the hinge rod 144 away from the corn chopper assembly. A handle 151 is secured to the shoud 26 at the side opposite the floating pivotal mounting thereof, and suitable latch mechanisms 152 may be arranged about the gear housing assembly 24 for engaging catches 153 on the shroud 26 whereby to maintain the latter in closed position. When the shroud 26 is pivoted away from the corn chopper assembly, the screen assembly 112 may be removed either for maintenance or for replacement by another screen assembly having smaller or larger perforations. Various features of the corn chopper assembly are claimed in the copending application of Robert L. Glidden, John H. Fulper and Richard E. Doerfer, Ser. No. 406,429, filed Oct. 26, 1964.

Arranged immediately beneath the corn chopper assembly within the housing 20 is a roller mill assembly. To direct fragmented corn from the corn chopper assembly to the roller mill assembly, the gear housing assembly 24, as shown in FIGURE 3, is formed with downwardly inclined wall sections 154 from which depend spaced baffles or shields 155 that extend into the housing 20. The roller mill housing 20 is comprised of rear and front walls 156 and 157, and side walls 158 and 159. The roller mill assembly may be comprised, for example, of a pair of cooperating rollers having associated therewith sheaves 184 that have driving connection by means of endless belts 252 with the impeller drive sheave 70. This drive train, which is enclosed within the cover 44 (FIGURE 1), may also serve to power the horizontal auger within the auger housing 34. One embodiment of roller mill assembly that may be used with the corn chopper assembly disclosed herein is described and claimed in the copending application of Richard R. Neebel and Richard E. Doerfer, Ser. No. 406,428, filed Oct. 26, 1964, and of Robert L. Glidden, Ser. No. 406,430, filed Oct. 26, 1964.

In the operation of the above-described apparatus, the drive shaft 42 is connected to a power take-off shaft and the impeller 86 and other associated devices are thereby rotated. Then ears of corn, with or without shucks, are introduced into the lower end of the feeder auger housing 30 wherefrom they are conveyed upwardly to the hopper 28. From the hopper 28 the ears of corn drop by gravity into the corn chopper assembly. As they fall onto the high impeller vane members 94, the ears of corn are fractured into pieces to assist subsequent fragmentation and moved centrifugally outwardly; gravity concurrently pulls the material downwardly. Due to the pyramidal shape of the impeller 86, decreasing clearance is provided between the impeller and the screen assembly or perforated enclosure means 112 whereby as the material moves downwardly it is wedged against the screen assembly 112 and moved into the area of the shearing bars 120. As the impeller cutter bars 98 and 102 pass the stationary shearing or cutter bars 120, the material being processed is sheared into fragments. Fragments which are small enough to pass through the screen perforations 116 are thrust therethrough by centrifugal force and the natural air flow or fanning action of the impeller 86. Fragments also pass through the perforations 56 in the plate 54. The size of the perforations 116 may of course be varied to meet desired sizing requirements. The concave pyramidal shape of the impeller 86 further provides a pulsing action during the processing operation to improve efficiency. Also, by reason of the polygonal configuration of the screen 112, the cutters 98 and 102 at the terminal ends of the impeller vanes are permitted not only to come close to the screen cutter bars 120 but also to come close to the screen wall sections 114 between adjacent screen cutters 120 whereby to force material through the screen thus increasing the discharge capacity over conventional round screen constructions. In this connection, the space provided adjacent the sides of the screen cutters 120 serves to accommodate the flow of material being fragmentized at the screen cutter bars 120 whereby to facilitate discharge of the fragments through the screen and thereby minimize power requirements. Material fragments passing through the screen perforations 116 drop by gravity through the grain passageway areas 63 in the gear housing assembly 24 and are directed by the wall portions 154 and baffles 155 to the roller mill assembly within the housing 20. The final product leaving the roller mill assembly is conveyed through the horizontal auger housing 34, vertical auger housing 36 and gravity discharge spout 38 to the point of discharge.

While I have shown and described what I believe to be a preferred embodiment of my present invention, it will be understood by those skilled in the art that various rearrangements and modifications may be made therein without departing from the spirit and scope of my invention.

I claim:
1. Apparatus for chopping material such as ears of corn, comprising a rotatable impeller having a plurality of radial vanes, cutter bars detachably mounted at the outer ends of said vanes and each having at least two generally parallel cutting edges, said cutter bars being reversible relative to said vanes whereby to permit said cutting edges of each of said cutter bars to be alternately presented, perforated wall means extending about the circumference of said impeller, said perforated wall means comprising a plurality of independent perforated flat wall sections, shearing means circumferentially spaced about said perforated wall means and arranged for cooperation with said cutter bars at the outer ends of said vanes, and said impeller upon rotation serving to fracture material fed thereto into pieces and to move the latter by centrifugal force toward said perforated wall means where said pieces are sheared into fragments as said cutter bars at the ends of said vanes pass said shearing means and then thrust by centrifugal force through said perforated wall means.

2. Apparatus for chopping material such as ears of corn, comprising an impeller having a plurality of radial vanes rotatable about a vertical axis, vertical cutter bars detachably mounted at the outer ends of said vanes and each having four vertical cutting edges, said cutter bars being reversible and invertible relative to said vanes whereby to permit said cutting edges of each of said cutter bars to be alternately presented, vertically disposed perforated wall means extending about the circumference of said impeller, said perforated wall means comprising a plurality of independent perforated flat wall sections, shearing means selectively spaced between said perforated wall sections and arranged for cooperation with said cutter bars at the outer ends of said vanes, and said impeller upon rotation serving to fracture material fed thereto into pieces and to move the latter by centrifugal force toward said perforated wall means where said pieces are sheared into fragments as said cutter bars at the ends of said vanes pass said shearing means and then thrust by centrifugal force through said perforated wall means.

3. Apparatus for chopping material such as ears of corn, comprising a rotatable impeller having a plurality of radial vanes, perforated wall means extending about the circumference of said impeller, said perforated wall means being comprised of a plurality of generally rectangular flat perforated rigid wall sections each having at the sides thereof radially inwardly directed flange portions, cutter bars interposed alternately with said wall sections, each of said cutter bars having sides seating against said flange portions of adjacent wall sections and having forward cutting edges disposed radially inwardly beyond the ends of said flange portions, means for securing each of said cutter bars between the adjacent wall sections, and said impeller upon rotation serving to fracture material fed thereto into pieces and to move the latter by centrifugal force toward said perforated wall means where said pieces are sheared into fragments as the ends of said vanes pass said cutter bars and then thrust by centrifugal force through said perforated wall means.

4. Apparatus for chopping material such as ears of corn, comprising an impeller having a plurality of radial vanes rotatable about a vertical axis, vertical cutter bars detachably mounted at the outer ends of said vanes, a plurality of flat stationary vertically disposed perforated rigid wall sections extending about the circumference of said impeller, a plurality of stationary cutter bars selectively detachably mounted between said perforated wall sections for cooperation with said cutter bars at the outer ends of said vanes, and said impeller upon rotation serving to fracture material fed thereto into pieces and to move the latter by centrifugal force toward said perforated wall sections where said pieces are sheared into fragments as said cutter bars at the ends of said vanes pass said stationary cutter bars and then thrust by centrifugal force through said perforated wall sections.

5. Apparatus for chopping material such as ears of corn, comprising an impeller having a plurality of radial vanes rotatable about a vertical axis, vertical cutter bars detachably mounted at the outer ends of said vanes and each having at least two vertical cutting edges, said cutter bars being reversible relative to said vanes whereby to permit said cutting edges of each of said cutter bars to be alternately presented, vertically disposed perforated wall means extending about the circumference of said impeller, said perforated wall means being comprised of a plurality of generally rectangular perforated wall sections each having at the sides thereof radially inwardly directed flange portions, stationary cutter bars interposed alternately with said wall sections, each of said cutter bars having sides seating against said flange portions of adjacent wall sections and having forward vertical cutting edges disposed radially inwardly beyond the ends of said flange portions, means for securing each of said cutter bars between the adjacent wall sections, and said impeller upon rotation serving to fracture material fed thereto into pieces and to move the latter by centrifugal force towards said perforated wall means where said pieces are sheared into fragments as said cutter bars at the ends of said vanes pass said stationary cutter bars and then thrust by centrifugal force through said perforated wall means.

6. Apparatus for chopping material such as ears of corn, comprising an impeller having a plurality of radial vanes rotatable about a vertical axis, vertical cutter bars detachably mounted at the outer ends of said vanes and each having four vertical cutting edges, said cutter bars being reversible and invertible relative to said vanes whereby to permit said cutting edges of each of said cutter bars to be alternately presented, vertically disposed perforated wall means extending about the circumference of said impeller, said perforated wall means being comprised of a plurality of generally rectangular perforated wall sections each having at the sides thereof radially inwardly directed flange portions and radially outwardly directed lugs, stationary cutter bars interposed alternately with said wall sections, each of said stationary cutter bars having sides seating against said flange portions adjacent wall sections and having forward vertical cutting edges disposed radially inwardly beyond the ends of said flange portions, each of said stationary cutter bars having rearwardly extending lugs that are secured between said lugs of adjacent wall sections, and said impeller upon rotation serving to fracture material fed thereto into pieces and to move the latter by centrifugal force toward said perforated wall means where said pieces are sheared into fragments as said cutter bars at the ends of said vanes pass said stationary cutter bars in said perforated wall means and then thrust by centrifugal force through said perforated wall means.

7. For use in apparatus for chopping material such as ears of corn, an impeller assembly comprising an impeller rotatable about a vertical axis and having a plurality of upwardly extending radial vanes, cutter bars detachably mounted at the outer ends of said vanes and extending radially therefrom and each having four vertical cutting edges, said cutter bars being reversible and invertible relative to said vanes whereby to permit said cutting edges of each of said cutter bars to be alternately presented.

8. For use in apparatus for chopping material such as ears of corn, a screen assembly comprising stationary vertically disposed perforated wall means, including a plurality of perforated flat rigid wall sections and a plurality of stationary vertical cutter bars detachably mounted within said perforated wall means.

9. For use in apparatus for chopping material such as ears of corn, comprising a screen assembly comprising a plurality of generally rectangular perforated wall sections each having at the sides thereof radially inwardly directed flange portions, cutter bars interposed alternately with said wall sections, each of said cutter bars having sides seating against said flange portions of adjacent wall sections and having forward vertical cutting edges disposed radially inwardly beyond the ends of said flange portions, and means for securing each of said cutter bars between adjacent wall sections.

10. For use in apparatus for chopping material such as ears of corn, a polygonal screen assembly enclosure comprising a plurality of generally rectangular perforated wall sections each having at the sides thereof radially inwardly directed flange portions and radially outwardly directed lugs, cutter bars interposed alternately with said wall sections, each of said cutter bars having sides seating against said flange portions of adjacent wall sections and having forward vertical cutting edges disposed radially inwardly beyond the ends of said flange portions, and each of said cutter bars having rearwardly extending lugs that are secured between said lugs of adjacent wall sections.

11. The screen assembly enclosure of claim 10 wherein said cutter bars have mounting pin members at the opposite ends thereof.

12. For use in a sizing screen assembly, a generally rectangular perforated flat rigid wall section having at the sides thereof flange portions and outwardly directed lugs, said lugs serving to adapt said wall section for connection to other wall sections when disposed in generally side relation to said lugs.

References Cited

UNITED STATES PATENTS

| | | | |
|---|---|---|---|
| 133,126 | 11/1872 | Smead | 30—313 |
| 1,194,049 | 8/1916 | Marsh | 30—313 |
| 1,858,527 | 5/1932 | Simmons | 241—294 |
| 2,192,382 | 3/1940 | Koch | 241—73 |
| 2,310,236 | 2/1943 | Hauge | 241—73 |
| 3,194,288 | 7/1965 | Dodgen et al. | 241—88 |
| 748,836 | 1/1904 | Batdorf | 133—3 |
| 1,929,586 | 10/1933 | Holland-Letz | 146—101 |

ANDREW R. JUHASZ, *Primary Examiner.*